US007783301B2

(12) United States Patent
Bornholdt

(10) Patent No.: US 7,783,301 B2
(45) Date of Patent: Aug. 24, 2010

(54) METHOD AND DEVICE FOR DETERMINING A LOCATION OF A COMMUNICATIONS DEVICE

(75) Inventor: James M. Bornholdt, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 768 days.

(21) Appl. No.: 11/612,674

(22) Filed: Dec. 19, 2006

(65) Prior Publication Data

US 2008/0146246 A1 Jun. 19, 2008

(51) Int. Cl.
*H04M 11/04* (2006.01)
*H04W 24/00* (2009.01)

(52) U.S. Cl. .............. 455/456.1; 455/404.2; 455/456.5; 455/456.6

(58) Field of Classification Search .............. 455/404.2, 455/456.1, 456.5, 456.6; 701/207
See application file for complete search history.

(56) References Cited

U.S. PATENT DOCUMENTS

| 6,671,514 | B1 * | 12/2003 | Cedervall et al. | ........ 455/456.1 |
| 6,748,226 | B1 * | 6/2004 | Wortham | ................. 455/456.6 |
| 7,072,669 | B1 | 7/2006 | Duckworth | |
| 7,092,726 | B2 * | 8/2006 | Shi et al. | ................. 455/456.6 |
| 7,212,159 | B2 * | 5/2007 | Dooley | ........................ 342/453 |
| 2002/0196187 | A1 * | 12/2002 | Holt | ............................. 342/453 |
| 2003/0054845 | A1 * | 3/2003 | Krasny et al. | ............... 455/506 |
| 2003/0144011 | A1 * | 7/2003 | Richards et al. | ............. 455/456 |
| 2004/0147267 | A1 * | 7/2004 | Hill et al. | ................. 455/456.1 |
| 2005/0222757 | A1 * | 10/2005 | Coluzzi et al. | .............. 701/207 |

OTHER PUBLICATIONS

The Boeing Company, International Search Report corresponding to International Patent Application No. PCT/US2007/087165, dated Apr. 21, 2008.
The Boeing Company, Written Opinion corresponding to International Patent Application No. PCT/US2007/087165, dated Apr. 21, 2008.

* cited by examiner

*Primary Examiner*—Nick Corsaro
*Assistant Examiner*—Edd Rianne Plata
(74) *Attorney, Agent, or Firm*—Charles L. Moore; Moore & Van Allen, PLLC

(57) ABSTRACT

A method to determine a location of a communications device may include measuring a time of arrival for each pulse received at a receiver. The method may also include generating a set of possible hypothetical matches between each received pulse and a transmission path between a transmitter and the receiver, wherein the communications device being located is one of the transmitter and the receiver. The method may further include estimating the location of the communications device using the set of hypothetical matches.

28 Claims, 13 Drawing Sheets

| Path, time matching hypothesis | Path paired with arrival time 1 (First Pulse) | Path paired with arrival time 2 (Second Pulse) | Path paired with arrival time 3 (Third Pulse) | Path paired with arrival time 4 (Fourth Pulse) | Path paired with arrival time 5 (Fifth Pulse) | Intersection Error Metric | |
|---|---|---|---|---|---|---|---|
| 1 | T1R1 | T1S1R1 | T1S2R1 | T1S1S2R1 | T1S2S1R1 | 0.361906636 | |
| 2 | T1R1 | T1S1R1 | T1S2R1 | T1S2S1R1 | T1S1S2R1 | 0.496401306 | |
| 3 | T1R1 | T1S1R1 | T1S1S2R1 | T1S2R1 | T1S2S1R1 | 0.368550342 | |
| 4 | T1R1 | T1S1R1 | T1S1S2R1 | T1S2S1R1 | T1S2R1 | 0.7442371 | |
| 5 | T1R1 | T1S1R1 | T1S2S1R1 | T1S2R1 | T1S1S2R1 | 0.363881818 | |
| 6 | T1R1 | T1S1R1 | T1S2S1R1 | T1S1S2R1 | T1S2R1 | 0.894663592 | |
| 7 | T1R1 | T1S1R1 | T1S2R1 | T1S1S2R1 | T1S2S1R1 | 0.702465504 | |
| 8 | T1R1 | T1S1R1 | T1S1R1 | T1S1S2R1 | T1S1S2R1 | 0.125040905 | |
| 9 | T1R1 | T1S1R1 | T1S1S2R1 | T1S1R1 | T1S2S1R1 | 0.238052047 | |
| 10 | T1R1 | T1S1R1 | T1S1S2R1 | T1S2S1R1 | T1S1R1 | 0.12048409 | |
| 11 | T1R1 | T1S1R1 | T1S2S1R1 | T1S1R1 | T1S1S2R1 | 0.485571384 | |
| 12 | T1R1 | T1S1R1 | T1S2S1R1 | T1S1S2R1 | T1S1R1 | 0.007894174 | Best Hypo |
| 13 | T1R1 | T1S1S2R1 | T1S1R1 | T1S2R1 | T1S1R1 | 0.740014404 | |
| 14 | T1R1 | T1S1S2R1 | T1S1R1 | T1S2S1R1 | T1S2R1 | 0.892787746 | |
| 15 | T1R1 | T1S2S1R1 | T1S2R1 | T1S1R1 | T1S2S1R1 | 0.279782831 | |
| 16 | T1R1 | T1S2S1R1 | T1S1R1 | T1S1R1 | T1S2R1 | 0.958507357 | |
| 17 | T1R1 | T1S2S1R1 | T1S2S1R1 | T1S1R1 | T1S1R1 | 0.712076548 | |
| 18 | T1R1 | T1S2S1R1 | T1S1R1 | T1S2R1 | T1S1R1 | 0.515109042 | |
| 19 | T1R1 | T1S2S1R1 | T1S1R1 | T1S1R1 | T1S1S2R1 | 0.097231853 | |
| 20 | T1R1 | T1S2S1R1 | T1S2R1 | T1S1R1 | T1S2R1 | 0.125353106 | |
| 21 | T1R1 | T1S2S1R1 | T1S2R1 | T1S1S2R1 | T1S1R1 | 0.304184484 | |
| 22 | T1R1 | T1S2S1R1 | T1S1S2R1 | T1S1R1 | T1S2R1 | 0.607146616 | |
| 23 | T1R1 | T1S2S1R1 | T1S1S2R1 | T1S1R1 | T1S2R1 | 0.998244032 | |
| 24 | T1R1 | T1S2S1R1 | T1S1S2R1 | T1S2R1 | T1S1R1 | 0.965963426 | |
| | | | | | Min Error | 0.007894174 | |

FIG. 10

METHOD AND DEVICE FOR DETERMINING A LOCATION OF A COMMUNICATIONS DEVICE

BACKGROUND OF THE INVENTION

The present invention relates to communications devices or the like and more particularly to a method and device for determining a location of a communications device or similar device capable of transmitting or receiving a radio frequency or electromagnetic signal.

Under various circumstances, determining a location of a communications device or a communications device operating in a transmit mode (transmitter) or a receive mode (receiver) may be important. For example in military, law enforcement or other applications being able to determine a geographic location of a radio transmitter may be very beneficial, particularly being able to determine the location when the transmitter and receiver are not in a line of sight transmission path or non-line of sight (NLOS) path with one another. NLOS paths may be sufficiently strong that phase coherent techniques fail, or insufficient space exists for directional antennas on receivers. Such scenarios may occur in close quarters operations or when the transceiver and receiver may be in the same building.

Determining a location of a transmitter may be helpful in radio navigation. One technique of determining a geographic location of a transmitter is trilateration. Trilateration requires a minimum of three range measurements to determine a receiver location. Existing solutions that require line of sight (LOS) paths for trilateration fail in cases where less than three transmitters are available or when less than three detectable LOS signals are available due to path attenuation. Current solutions when three available transmitter or LOS signals are not available may include increasing the number of transmitters to increase the probability that at least three may be available, change the radio parameters of the link, such as frequency, antenna diversity, polarization diversity or other parameters, rely on other means of navigation, such as inertial devices or the like, to temporarily replace the trilateration navigation until more transmitters or acceptable transmission paths become available.

Increasing the number of available transmitters increases operating costs and may decrease survivability of the system for operations such as military operations or similar operations. Changing radio parameters of the link increases complexity of transmitters and receivers and requires communications between the transmitters and the receivers to change the radio parameters. The accuracy of inertial devices tends to decrease over time.

BRIEF SUMMARY OF THE INVENTION

In accordance with an embodiment of the present invention, a method to determine a location of a communications device may include measuring a time of arrival for each pulse received at a receiver. The method may also include generating a set of possible hypothetical matches between each received pulse and a transmission path between a transmitter and the receiver, wherein the communications device being located is one of the transmitter and the receiver. The method may further include estimating the location of the communications device using the set of hypothetical matches.

In accordance with another embodiment of the present invention, a method to determine a location of a communications device may include measuring a time of arrival for each pulse received at a receiver. The method may also include generating a set of possible hypothetical matches by matching each pulse received by the receiver to a possible transmission path of the received pulse between a transmitter and the receiver, wherein the communications device being located is one of the transmitter and the receiver. The method may additionally include determining a locus of possible communications device locations using each set of hypothetical matches for each pulse. The method may further include determining an estimated location of the communications device as an intersection of possible communications device location loci for each set of hypothetical matches for each pulse.

In accordance with another embodiment of the present invention, a device to determine a location of a communications device may include a processor. The device may also include a location determination module including a hypothetical transmission path evaluation element operable on the processor to evaluate a match between each received pulse and a possible transmission path of the pulse to determine a location of the communications device.

In accordance with another embodiment of the present invention, a computer program product to determine a location of a communications device may include a computer usable medium having computer usable program code embodied therein. The computer usable medium may include computer usable program code configured to measure a time of arrival for each pulse received at a receiver. The computer useable medium may also include computer usable program code configured to generate a set of possible hypothetical matches between each received pulse and a possible transmission path of the pulse between a transmitter and the receiver, wherein the communications device being located is one of the transmitter and the receiver. The computer useable medium may also include computer usable program code configured to estimate the location of the communications device using the set of hypothetical matches.

In accordance with another embodiment of the present invention, a vehicle may include a device to determine a location of the vehicle. The device may include a processor and a location determination module including a hypothetical match evaluation element operable on the processor to evaluate a match between each received pulse and a possible transmission path of the pulse to determine a location of the vehicle.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 10 is a table illustrating an example of sets of hypothetical matches between each received pulse and a possible transmission path over which the pulse may have been transmitted in accordance with an embodiment of the present invention.

DETAILED DESCRIPTION OF THE INVENTION

Figure 1A:
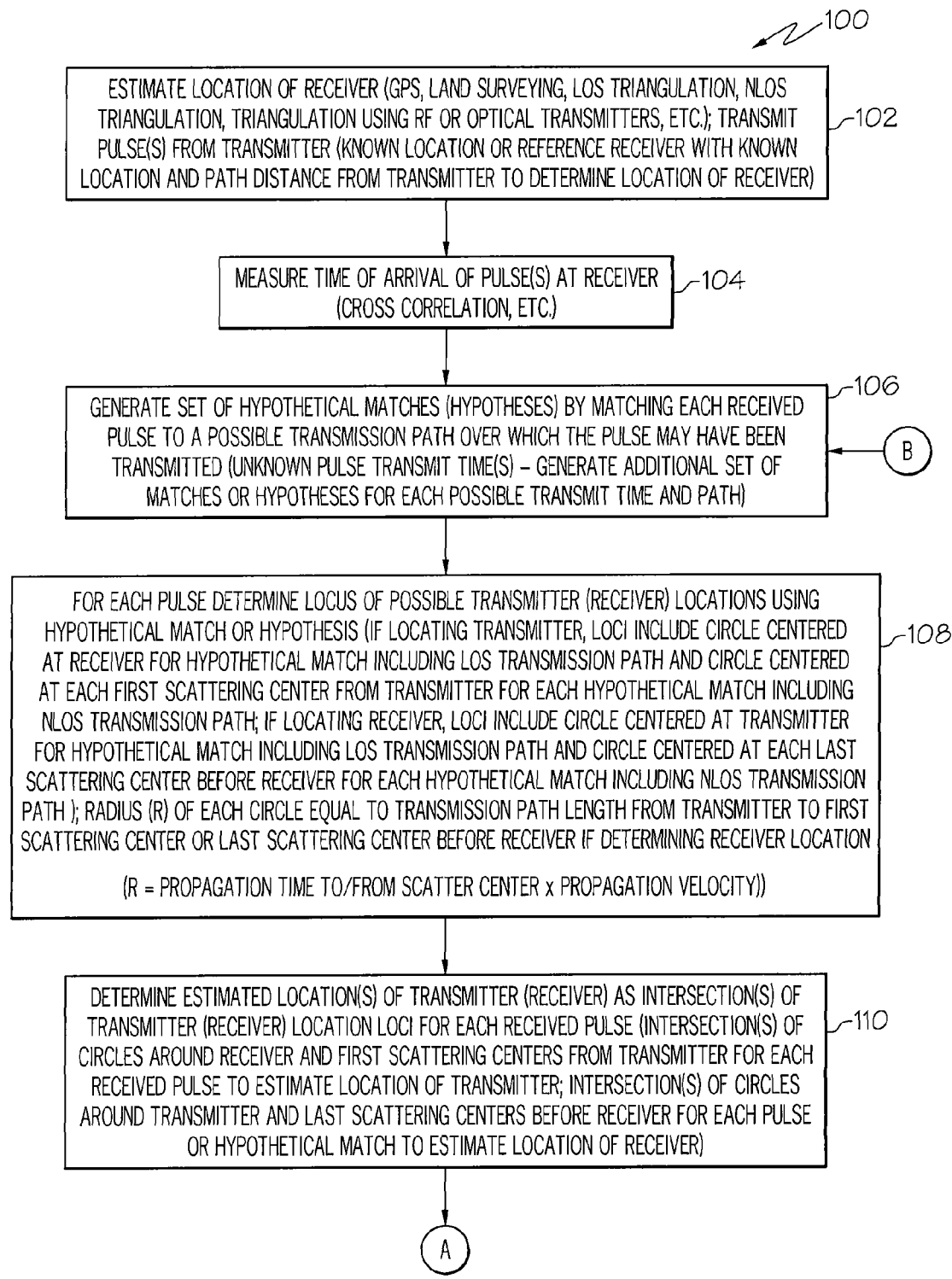
FIGS. 1A and 1B (collectively FIG. 1) are a flow chart of an exemplary method for determining a location of a communications device in accordance with an embodiment of a present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1B:
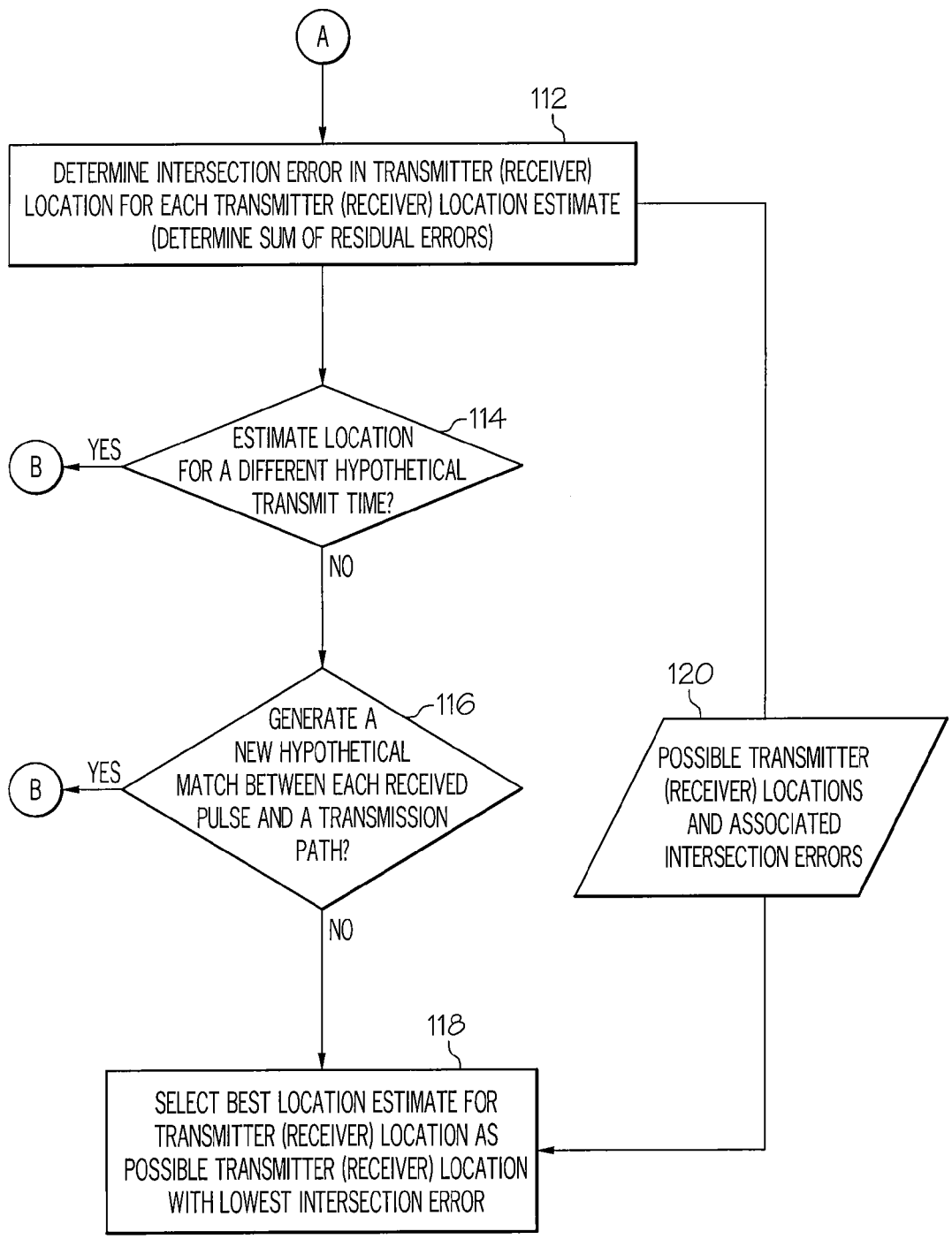

FIGS. 1A and 1B (collectively FIG. 1) are a flow chart of an exemplary method 100 for determining a location of a communications device in accordance with an embodiment of a present invention. As used herein, a communications device may be a receiver or a transmitter and the terms may be used interchangeably herein. A receiver may be a communications device operating as a receiver or in a receive mode. A transmitter may be a communications device operating as a transmitter or in a transmit mode.

In block 102, a location of a receiver may be estimated. The location may be a geographic location, location on some grid or coordinate system or any manner of identifying the location of a communications device relative to another communications device or other landmarks or artifacts. The location of the receiver may be estimated using a global positioning system (GPS), land surveying, LOS triangulation, NLOS triangulation, triangulation using radio frequency or optical transmitter or other location technique.

Also in block 102, a pulse or plurality of pulses may be transmitted from a transmitter. Depending upon whether the communications device being located is the transmitter or the receiver, the location of the other device, whose location is not being determined or estimated, may be known or a reference receiver with a known location and path distance from the device not being located may be used to determine the location of the unknown device.

In block 104, a time of arrival of a pulse or pulses may be measured or recorded at the receiver. The times of arrival of the pulses may be determined by cross correlation or other techniques.

In block 106, a set of hypothetical matches may be generated by matching each received pulse to a possible transmission path between a transmitter and a receiver. Each hypothetical match may define a hypothesis that the received pulse was transmitted via the matched transmission path. If the pulse transmit time or times are unknown another set of hypotheses may be generated for each hypothetical transmit time and path. An example of a method for generating hypothetical matches will be described in more detail with reference to FIG. 7. Briefly, all possible transmission paths from a transmitter to a receiver including any bounces, reflections or scattering of a signal pulse from any scattering centers that could be in the transmission path may be determined. All permutations of the transmission paths may be grouped into sets of elements (paths) based on the number of pulses received. Each set of elements or transmission paths may then be associated with a unique received pulse. A received pulse may be hypothetically matched with multiple possible transmission paths. The best or optimum matches between each received pulse and possible transmission path may then be determined as described herein.

A transmission path may be further defined as an ordered set of a transmitter, zero or more scattering centers, and a receiver. Line of Sight (LOS) transmission paths have no scattering centers in the path. Non Line of Sight (NLOS) transmission paths have one or more scattering centers in the path. Transmitters, receivers and scattering centers may be defined as nodes in the transmission path. The method 100 or algorithm assumes that the geographical location of each node is known a priori to operation except the one communications device (transmitter or receiver as the case may be) that is to be located. The method 100 or algorithm also assumes that any propagation delay inherent in each node and any delay in links between each node are known, excluding the last link which terminates on the communications device to be located. A scattering center may be any structure that may be in a transmission path between the transmitter and receiver.

Figure 3:
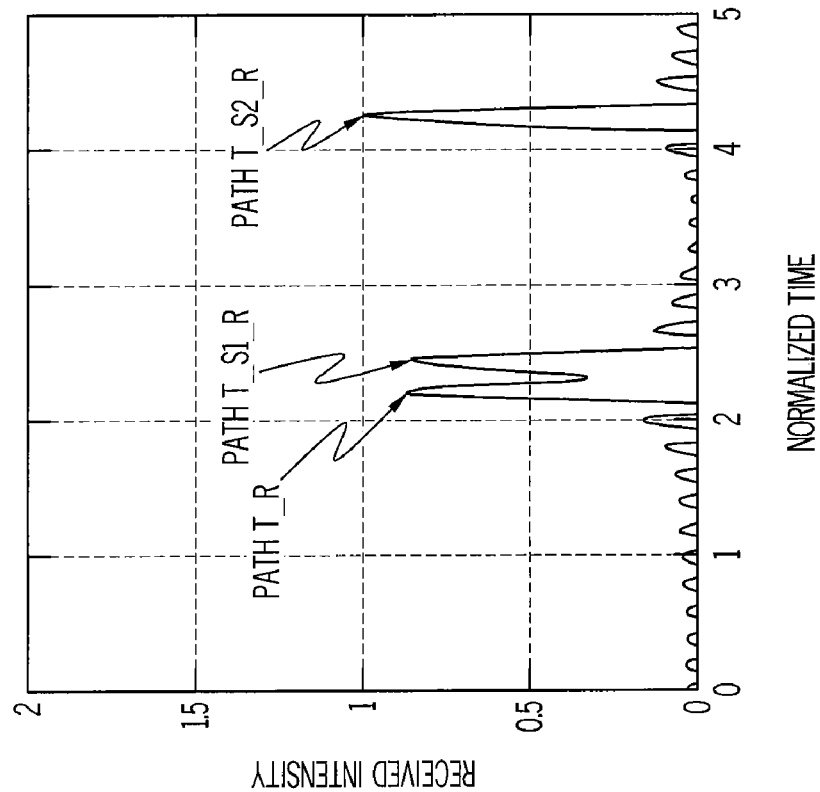
FIG. 3 is an illustration of received signal pulses corresponding to each of the exemplary transmission paths in FIG. 2.
Figure 2:
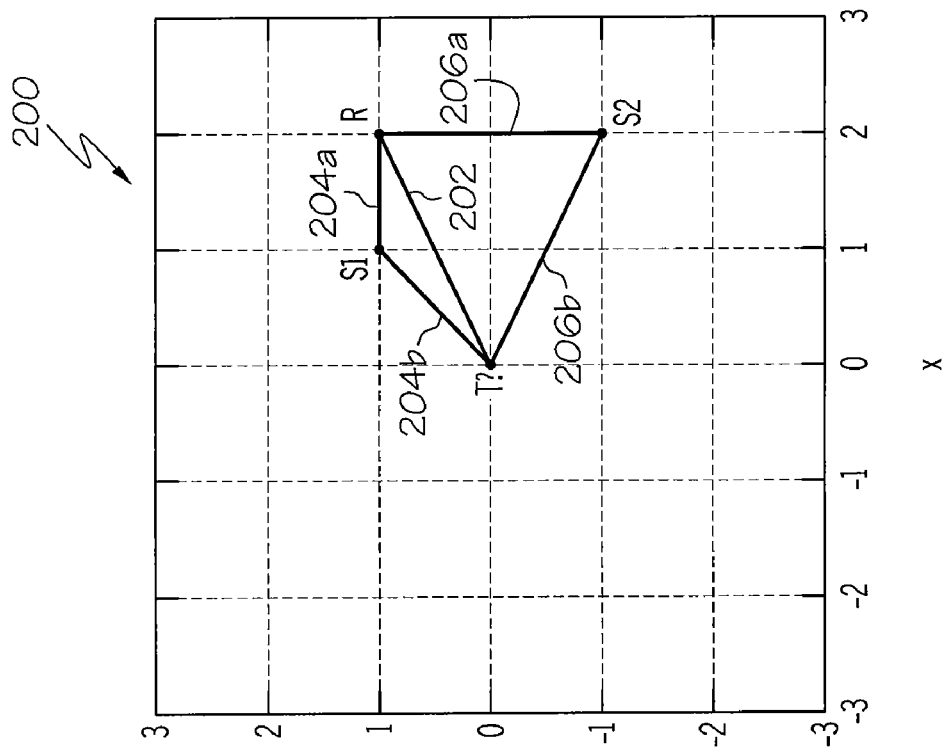
FIG. 2 is an illustration of exemplary transmission paths for determining a location of a communications device in accordance with an embodiment of the present invention.

Referring also to FIGS. 2 and 3, FIG. 2 is an illustration of exemplary transmission paths 200 for determining a location of a communications device in accordance with an embodiment of the present invention. In the example in FIG. 2, the location of the transmitter (T) may be unknown. The exemplary transmission paths 200 may include a direct transmission path or LOS transmission path 202 from the receiver (R) to the transmitter (T). A transmission path T-S1-R 204 from the transmitter, bouncing or scattering off scattering center S1 and then to the receiver. A transmission path T-S2-R 206 from the transmitter, bouncing or scattering off scattering center S2 and then to the receiver. There could also be double bounce transmission paths not shown in FIG. 2, such as T-S1-S2-R or T-S2-S1-R. As previously described, these transmission paths with one or more scattering centers (S1 and S2) may be defined as NLOS transmission paths.

FIG. 3 is an illustration of signal pulses received by the receiver (R) that may be hypothetically matched to each of the exemplary transmission paths 200 in FIG. 2. FIG. 3 also illustrates measuring or determining the time or arrival of each of the pulses as in block 104.

In block 108, for each received pulse, a locus of possible communications device (transmitter or receiver depending upon which is being located) locations may be determined using the hypothetical match or matches including possible transmission paths over which each pulse may have traveled. If the communications device to be located is the transmitter, the loci of possible communications device locations may include a circle centered at the receiver for a hypothetical match, associated with a particular received pulse, that includes a LOS transmission path, and a circle centered at each first scattering center from the transmitter for each hypothetical match, associated with a particular received pulse, that includes a NLOS transmission path. If the communications device to be located is the receiver, the loci of possible communications device locations may be include a circle centered at the transmitter for each hypothetical match, associated with a particular received pulse, that includes a LOS transmission path, and a circle centered at each last scattering center before the receiver for each hypothetical match, associated with a particular received pulse, that includes a NLOS transmission path.

Figure 4C:
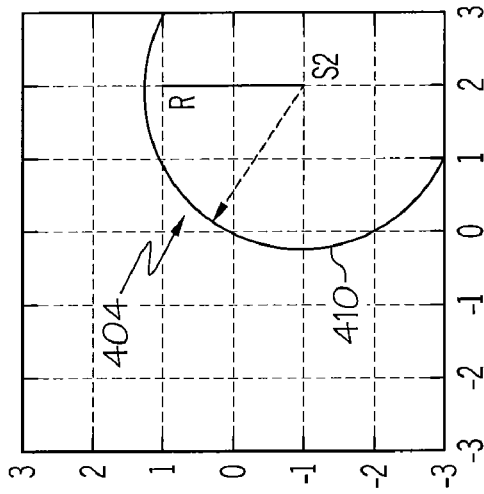
FIGS. 4A-4C are illustrations of examples of loci of possible locations of a communications device using hypothetical transmission paths in accordance with an embodiment of the present invention.
Figure 4B:
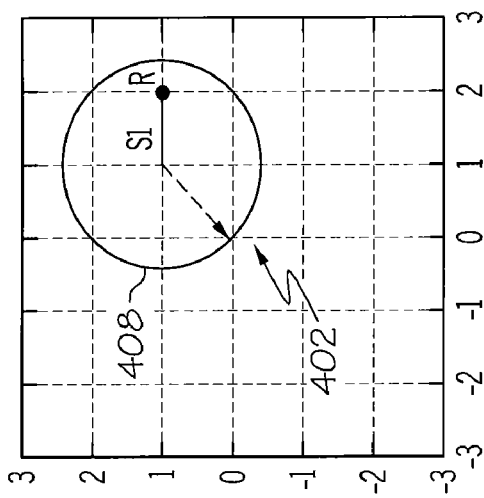
Figure 4A:
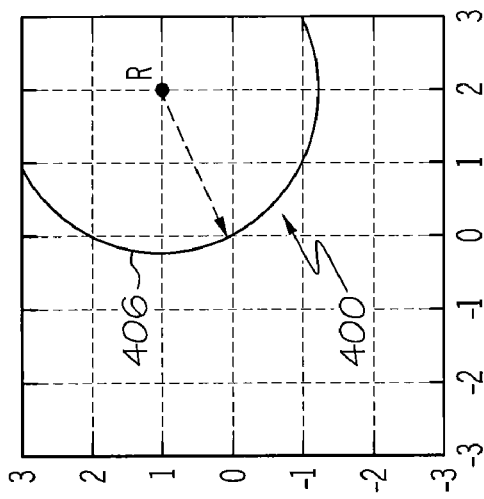

Referring also to FIGS. 4A-4C, FIGS. 4A-4C are illustrations of examples of loci 400-404 of possible locations of a communications device using a hypothetical match between each received pulse and a transmission path in accordance with an embodiment of the present invention. The particular example illustrated in FIGS. 4A-4C is for determining the location of the transmitter (T) in FIG. 2. Accordingly, the possible locations of the communications device or transmitter (T) for the hypothetical match including transmission path T-R will be the locus 400 defined by a circle 406 centered at the receiver (R). The possible locations of the transmitter (T) for the hypothetical match or hypothesis including transmission path T-S1-R will be locus 402 defined by a circle 408 centered at the scattering center S1. The possible locations of the transmitter (T) for the hypothetical transmission path T-S2-R will be the locus 404 defined by circle 410 centered around the scattering center S2.

The radius of each circle 406, 408, and 410 may be determined by the following calculations for each transmission path:

a) Calculate propagation time from first scattering center in path to receiver:

$t1$=(path distance/propagation velocity)+time delay of scattering centers b) Calculate total propagation time $t2$=receive time of associated pulse c) Calculate propagation time of first link (transmitter to first scattering center:

$t3 = t2 - t1 -$ time delays in receiver d) Calculate path length of first link $R = t3*$propagation velocity e) Find locus of possible transmitter positions:

Locus is a circle of radius R centered at a first scattering center in transmission path.

A similar set of calculation may be performed if determining or estimating the location of the receiver. A propagation time from a known transmitter location to a last scattering center before the receiver may be calculated. The propagation time from the last scattering to the receiver may then be determined by the difference between the total propagation time and the propagation time from the transmitter to the last scattering center minus any propagation delays in the receiver. The locus of possible receiver locations may then be a circle around the last scattering center with a radius corresponding to the path length from the last scattering center to the receiver. The path length may be calculated by multiplying the propagation time from the last scattering center to the receiver by the propagation velocity.

In block 110, an estimated location or locations of the transmitter or receiver depending upon which is being located, may be determined as the intersection of loci for each received pulse. In other words, if the transmitter is being located, the estimated location of the communications device may be the intersection of circles for each corresponding received pulse around the first scattering centers from the transmitter and the circle around the receiver for the received pulse or hypothetical match including the LOS transmission path. If the receiver is being located, the estimated location or locations may be the intersection of circles for each corresponding received pulse around the last scattering centers before the receiver and the circle around the transmitter for the hypothetical match including the LOS transmission path.

Figure 4D:
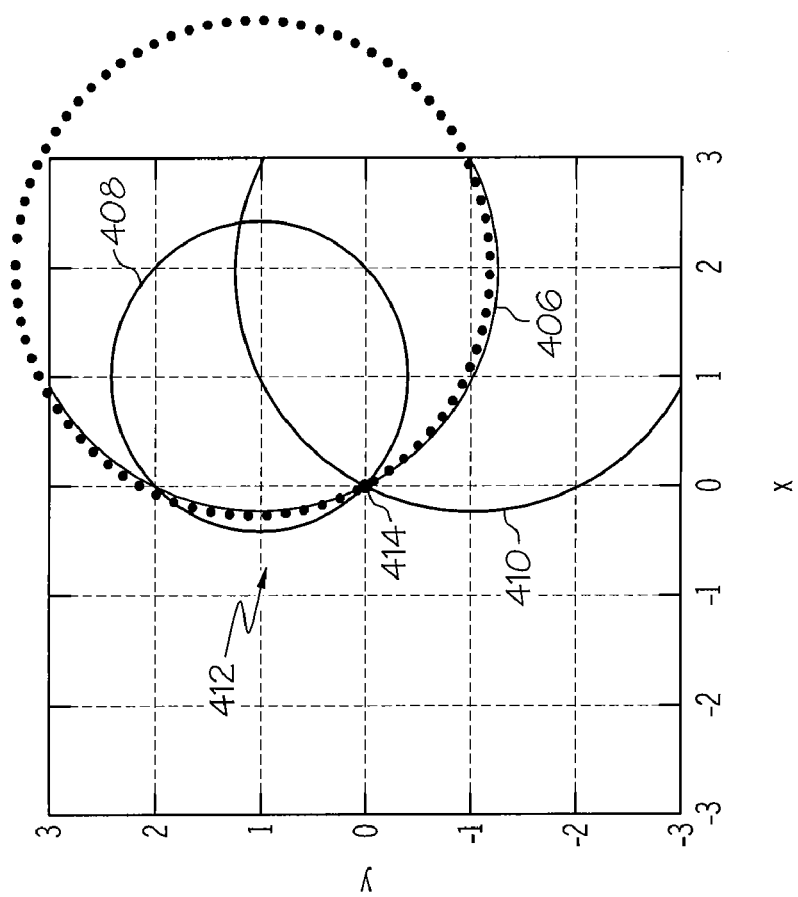
FIG. 4D is an illustration of an example of estimating a location of a communications device based on an intersection of loci of possible locations in accordance with an embodiment of the present invention.
Figure 6C:
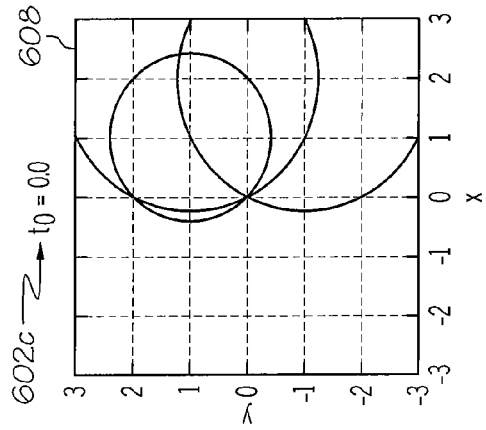
FIGS. 6A-6K illustrate an example of determining an estimated location of a communications device when a pulse transmit time is unknown in accordance with an embodiment of the present invention.
Figure 6B:
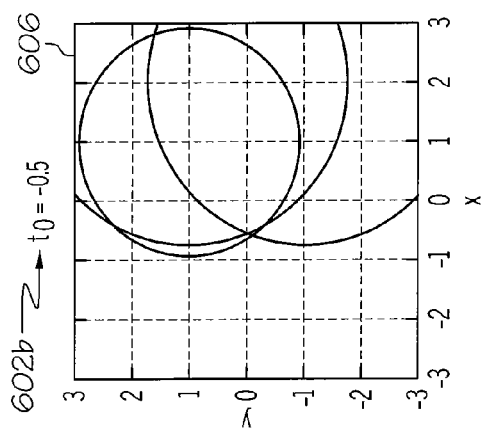
Figure 6A:
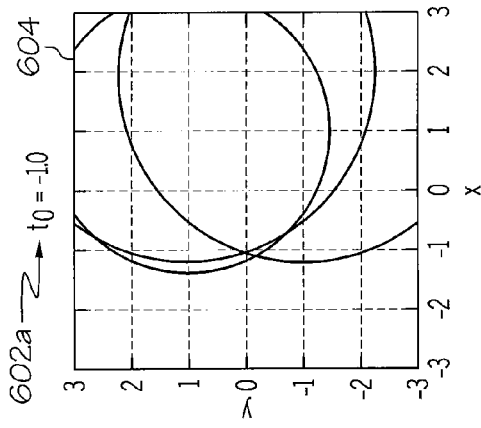
Figure 6H:
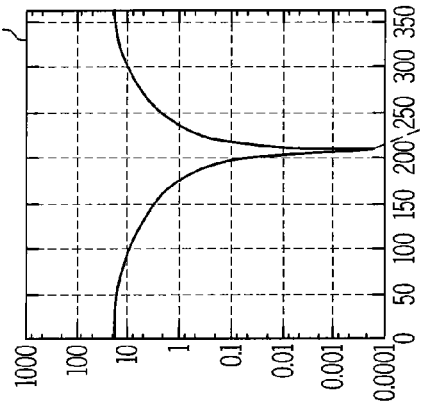
Figure 6G:
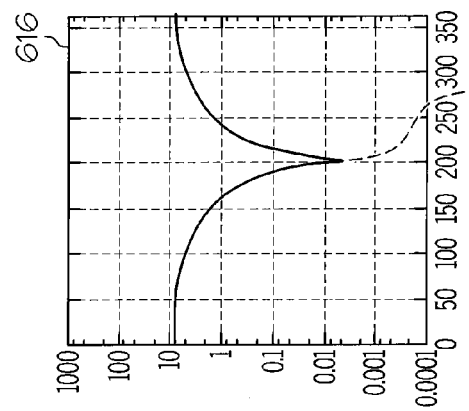
Figure 6F:
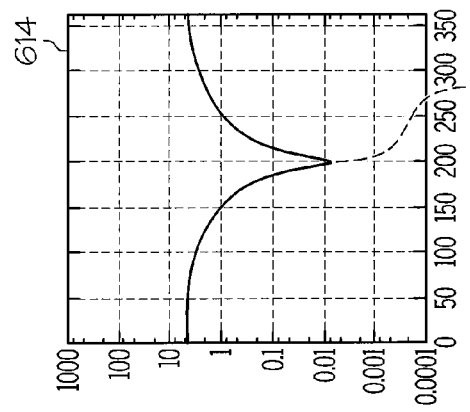
Figure 6E:
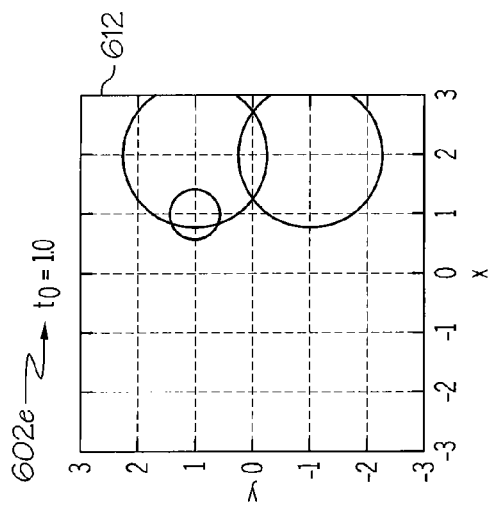
Figure 6D:
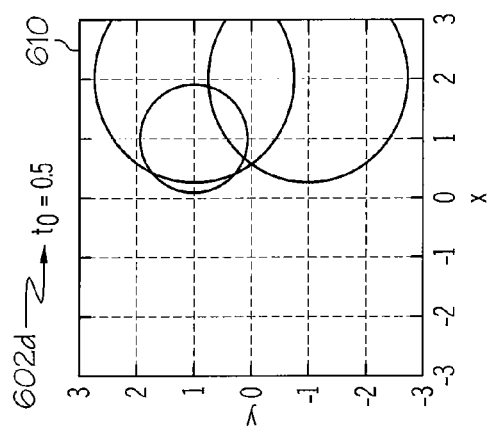
Figure 6J:
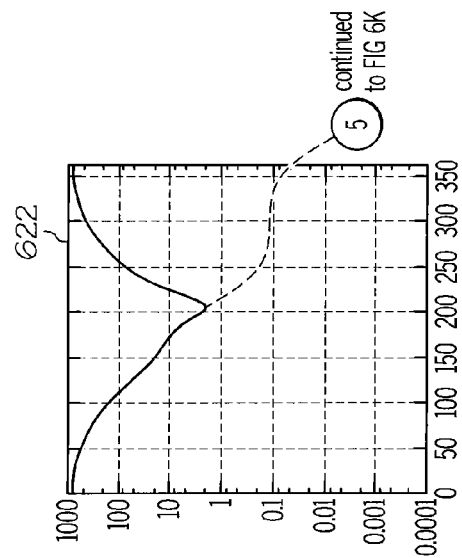
Figure 6I:
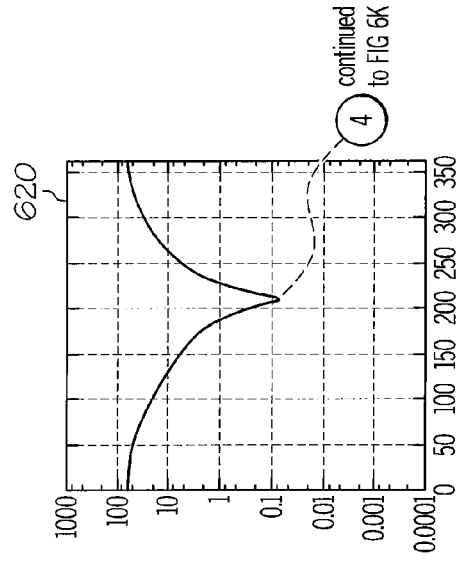
Figure 6K:
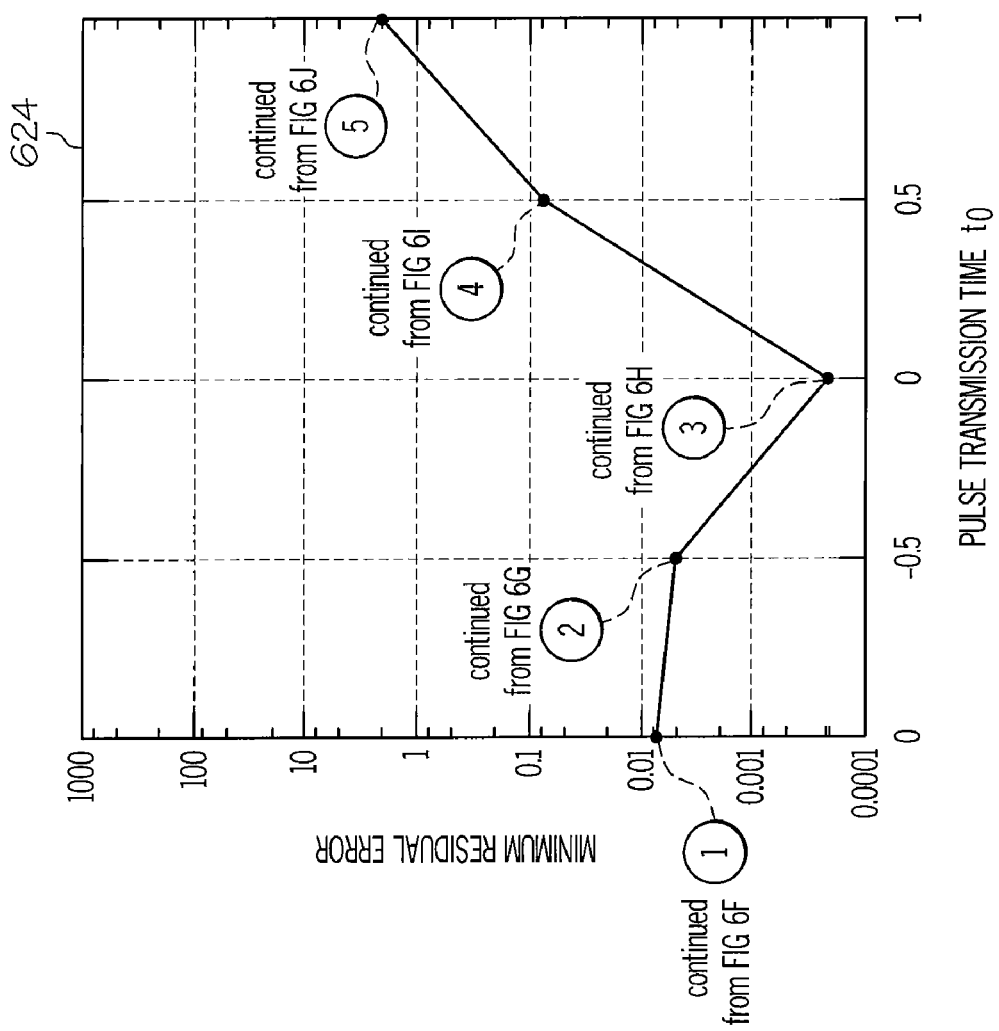

Referring also to FIG. 4D is an illustration of an example of estimating a location of a communications device based on an intersection of loci 412 of possible locations in accordance with an embodiment of the present invention. FIG. 4D is a continuation of the same example in FIG. 2 and FIGS. 4A-4C. The estimated location of the communications device or transmitter (T) in this example will be the intersection 414.

Figure 5:
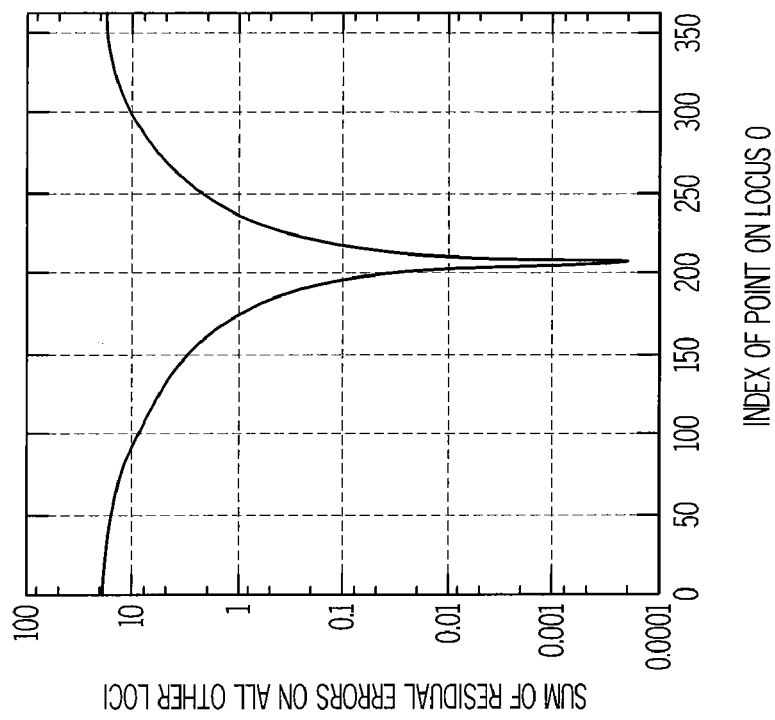
FIG. 5 is an illustration of an example of determining a residual error for an estimated location for a communications device in accordance with an embodiment of the present invention.

In block 112, an intersection error may be determined by defining a set of test points along one of the circular loci. For each test point, that point may be substituted into each of the remaining loci and a residual error calculated from each substitution. The intersection error at each test point may be determined as a sum of residual errors from each locus in block 110. The possible location of the communications device may be selected as the test point with the minimum sum of residual errors. The intersection error for this set of loci is the intersection error corresponding to the estimated location of the communications device. FIG. 5 is an illustration of an example of determining a residual error for an estimated location for a communications device in accordance with an embodiment of the present invention. FIG. 5 is a graph of residual error versus point index on a locus. The vertical axis in the sum of residual errors on all other loci and the horizontal axis is index of a point on locus 0. An example of a method to determine an intersection error for each communications device location estimate will be described in more detail with reference to FIG. 9.

In block 114, a determination may be made if location estimates need to be determined for a different hypothetical transmit time. As previously discussed, if pulse transmit times are unknown additional hypotheses may be generated for possible transmit times and transmission paths. If there is an additional hypothetical transmit time to be used, the method 100 may return to block 106 and the method 100 may proceed as previously described. If there are no additional hypothetical transmit times, the method 100 may advance to block 116.

In block 116, a determination may be made if new hypothetical matches between received pulses and transmission paths are needed. If new hypothetical matches between received pulses and transmission paths are needed, the method 100 may return to block 106 and the method 100 may proceed as previously described. If a new hypothetical match between a received pulse and a transmission path is not needed in block 116, the method 100 may advance to block 118.

In block 118 a best or optimum location estimate for the communications device (transmitter or receiver) may be selected as the possible communications device location estimate with the lowest intersection error 120.

FIGS. 6A-6K illustrate an example of determining an estimated location of a communications device when a pulse transmit time is unknown in accordance with an embodiment of the present invention. An intersection of loci 600 for each hypothetical transmission path for each pulse and each hypothetical pulse transmit time 602 ($t_0=-1.0$; $t_0=-0.5$; $t_0=0.0$; etc.) may be determined (as in block 110 of FIG. 1) which are illustrated in graphs 604-612 as estimated locations for the communications device. An intersection error for each communications device location estimate in graphs 604-612 may be determined similar to that described with respect to block 112 of FIG. 1. A graph of the of intersection errors for each of the respective communication device location estimates in graphs 604-612 is illustrated in graphs 614-622. Each of graphs 614-622 correspond respectively to estimated locations illustrated in graphs 604-612. The graphs 614-622 are residual error versus point index. The vertical axis is the sum of residual errors on all other loci and the horizontal axis is the index of the point on locus 0. The best or optimum communications device location estimate may be selected as the location estimate with the lowest intersection error (as determined in block 118 of FIG. 1) which is illustrated in graph 624 of FIG. 6K. Graph 624 is a graph of the minimum residual errors (vertical axis) versus pulse transmission time ($t_0$) 602 (horizontal axis) for each sum of residual errors in graphs 614-622. From the graph 624, the optimum or best communications device location estimate is provided by the intersection of the circles or loci in graph 608 in the example illustrated in FIGS. 6A-6K.

Figure 7:
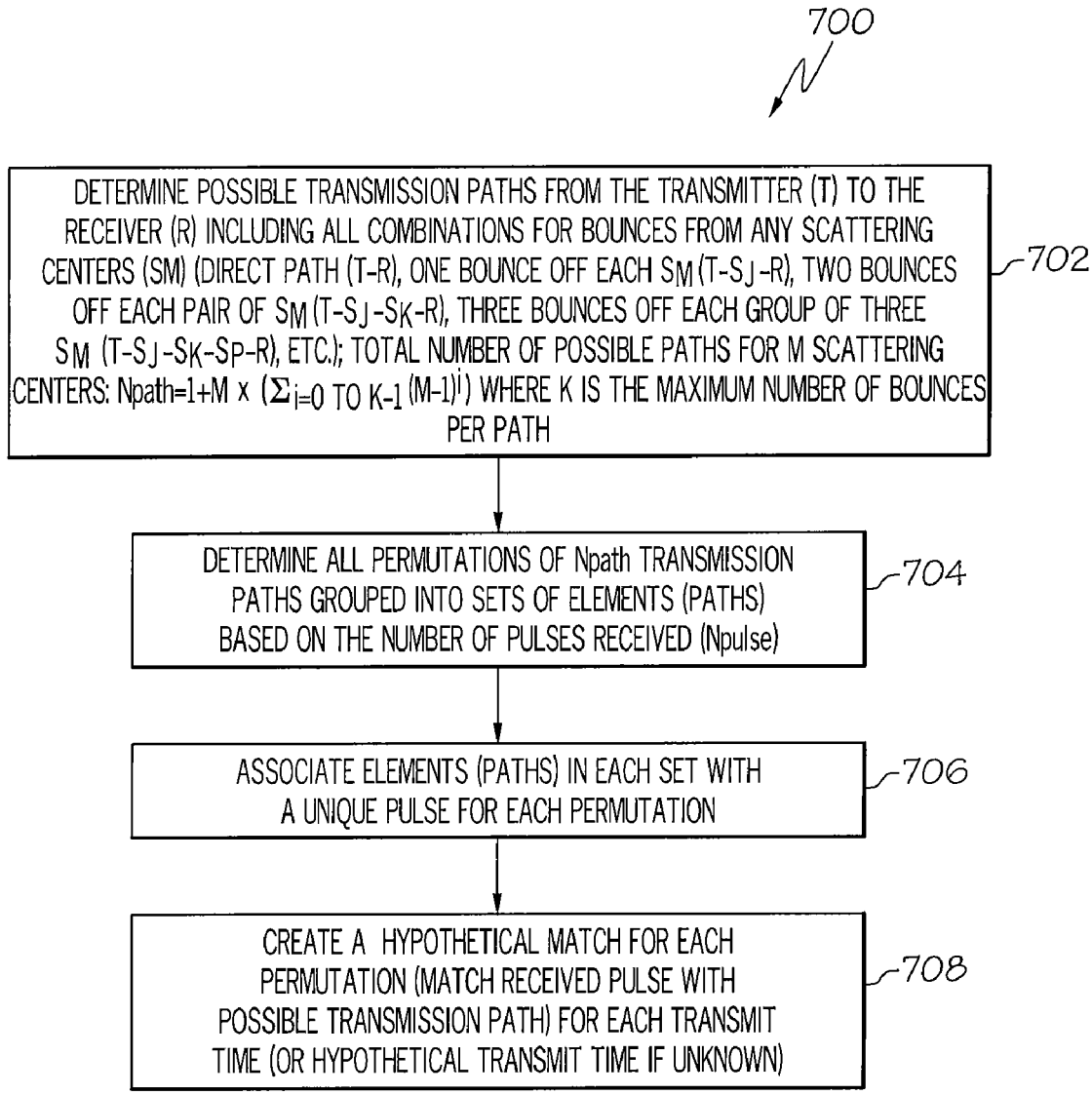
FIG. 7 is a flow chart of an example of method to generate possible hypothetical transmission paths for each received pulse and pulse transmission time in accordance with an embodiment of the present invention.
Figure 8A:
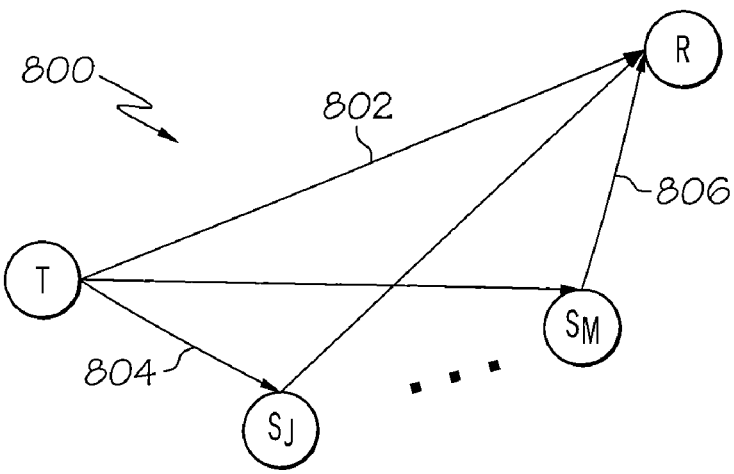
FIGS. 8A-8C are examples of hypothetical transmission paths from a transmitter to a receiver in accordance with an embodiment of the present invention.
Figure 8B:
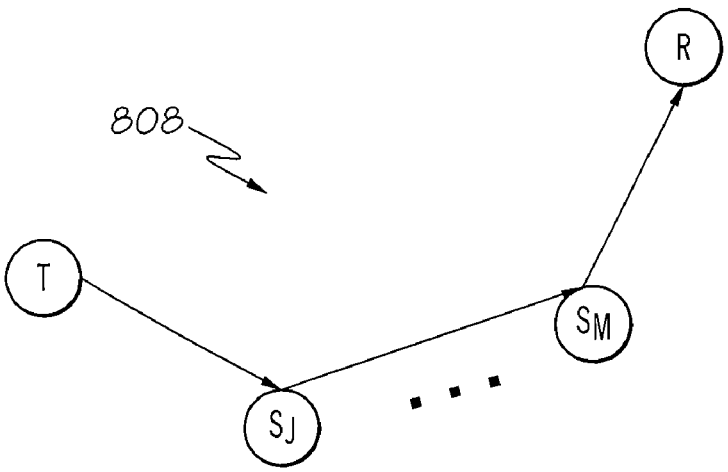
Figure 8C:
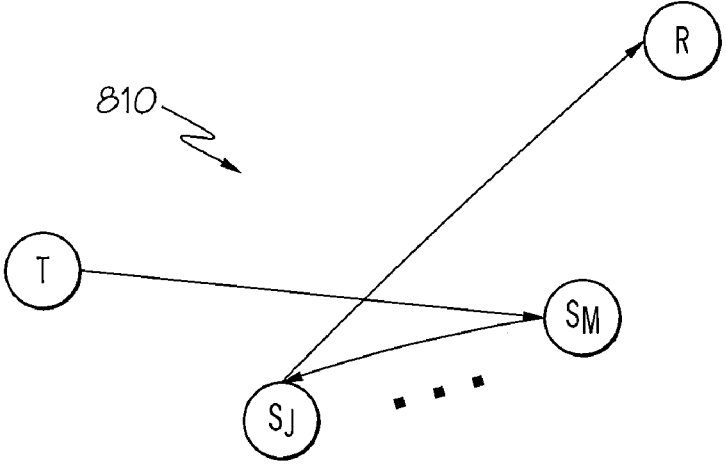

FIG. 7 is a flow chart of an example of method 700 to generate possible hypothetical transmission paths for each received pulse and pulse transmission time in accordance with an embodiment of the present invention. The method 700 may be used in the block 106 of the method 100 of FIG. 1. In block 702, possible transmission paths from the transmitter (T) to the receiver (R) including all combinations for bounces or scattering from any scattering centers ($S_M$). An example of determining possible transmission paths 800 is illustrated in FIGS. 8A-8C. Possible transmission paths 800 may include a direct path T-R 802, one bounce off each scattering center $S_M$, T-$S_j$-R 804, T-$S_M$-R 806, a double bounce T-$S_j$-$S_M$-R 808 or T-$S_M$-$S_j$-R 810. A total number of possible paths for M scattering centers may be represented by equation 1:

$$N_{path}=1+M^*(\Sigma_{i=0 \, to \, K-1}(M-1)^i) \qquad (1)$$

Where $N_{path}$ is the number of paths and K is the maximum number of bounces per path.

A hypothesis may include a transmit time $t_0$ and $N_{pulse}$ pairs of pulses and transmission paths. A transmission path may be designated or defined by $Path_j$, where j is an integer between 1 and $N_{path}$. A pulse may be designated by $Pulse_i$, where i is an integer between 1 and $N_{pulse}$. A pairing between $Pulse_i$ and $Path_j$ may be designated as ($Pulse_i$, $Path_j$). This pairing may represent a hypothesis that $Pulse_i$ results from a signal traveling along $Path_j$.

A single hypothesis may include a transmit time $t_0$ and $N_{pulse}$ (pulse, path) pairs. Each (pulse, path) pair may have a unique pulse so that the hypothesis includes a path for each pulse. For example, if there are 3 received pulses and 10 possible paths, a set of pairs for a hypothesis might be: ($Pulse_1$, $Path_{10}$), ($Pulse_2$, $Path_1$), ($Pulse_3$, $Path_4$).

In block 704, all permutations of $N_{path}$ transmission paths may be determined and grouped into sets of elements (paths) based on the number of pulses received ($N_{pulse}$). The number of permutations of $N_{path}$ paths taken $N_{pulse}$ at a time is given by: $M = N_{path}!/(N_{path}-N_{pulse})!$ The number of hypotheses $N_h$ may be the number of transmit times $N_{tt}$ multiplied by the number of path permutations M. In block 706, each set of elements (paths) may be associated or matched with a unique pulse for each permutation. In block 708, a hypothetical match may be created for each permutation for each transmit time or hypothetical transmit time if the transmit time is unknown. This method may be generalized to use more than one receiver. In this case an outer loop around the transmission path creation method may be provided to provide another set of transmission paths for each receiver.

Figure 9:
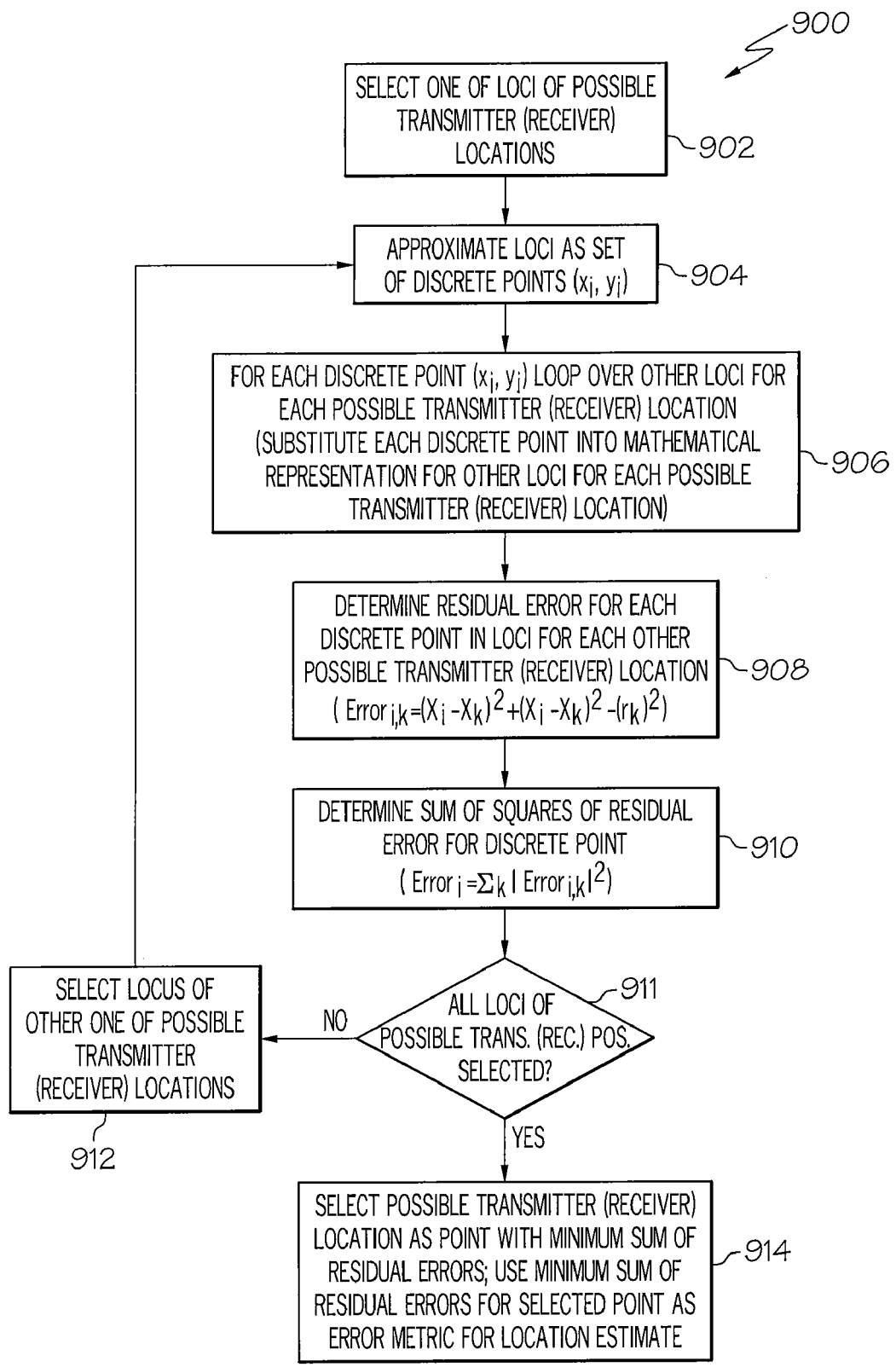
FIG. 9 is a flow chart of an example of a method to select a best or optimum location estimate for a communications device by calculating a residual error for each location estimate in accordance with an embodiment of the present invention.

FIG. 9 is a flow chart of an example of a method 900 to select a best or optimum location estimate for a communications device by calculating a residual error for each location estimate in accordance with an embodiment of the present invention. The method 900 may be used for the operation in module or block 112 in FIG. 1. In block 902, one of the loci of possible communication device (transmitter or receiver) locations may be selected. In block 904, the loci may be approximated as a set of discrete points $(x_i, y_i)$.

In block 906, each discrete point may be looped over other loci for each possible communications device location. Each discrete point may be substituted into a mathematical representation for other loci (k) for each possible communications device location.

In block 908, a residual error may be determined for each discrete point in the loci (k) for each other possible communications device location ($Error_{i,k} = (x_i - x_k)^2 + (y_i - y_k)^2 - (r_k)^2$). Where $r_k$ is the radius of the loci (k). In block 910, a sum of squares of residual error for each discrete point may be determined ($Error_i = \Sigma_k |Error_{i,k}|^2$).

In block 911, a determination may be made if all loci of possible communications device positions have been selected. If not, a locus of another one of the possible communications device locations may be selected and the method 900 may return to block 904. The method may then proceed as previously described. If all loci of possible communications device locations have been selected, the method 900 may advance to block 914.

In block 914, a possible communications device location may be selected as the discrete point with the minimum sum of residual errors. The minimum sum of residual errors may be used to select the point as the error metric for the location estimate.

FIG. 10 is a table 1000 illustrating an example of sets of hypothetical matches 1002 between each received pulse and a possible transmission path over which the pulse may have been transmitted in accordance with an embodiment of the present invention. The hypothetical matches 1002 are based on the example illustrated in FIG. 2. The hypothetical matches may be generated similar to that described with respect to block 106 in FIG. 1 and the method 700 in FIG. 7. As illustrated in FIG. 10, the first pulse to arrive or the pulse with the shortest arrival time in column 1004 may be assumed to be the LOS transmission path or direct path from the transmitter (T1) to the receiver (R1) or transmission path 202 in FIG. 2. The other possible transmission paths matched with later arriving pulses may be NLOS transmission paths that include a scattering center (S1 or S2 or both) as illustrated in FIG. 10.

Each cell in table 1000 may represent a locus or circle of possible transmitter or receiver locations depending upon which is being located similar to that previously described with reference to Block 108 of FIG. 1 and illustrated in FIGS. 4A-4C. An estimated location of the transmitter or receiver may be the intersection of the circles or loci for each set of hypothetical matches for each pulse in a row 1006, similar to that described with reference to Block 110 in FIG. 1 and illustrated in FIG. 4D.

An intersection error may be determined or calculated for each location estimate for rows 1006 in FIG. 10 similar to that described in Block 112 and method 900 in FIG. 9. Examples of intersection error metrics for the intersection of loci or circles for each row 1006 is illustrated in column 1008 of table 1000. In the example of FIG. 10, the set of hypothetical matches with the minimum error is in row 12 of rows 1006. Accordingly, the intersection of loci or circles formed by the hypothetical matches in row 12 may be selected as the best location estimate similar to that described in Block 118.

Figure 11:
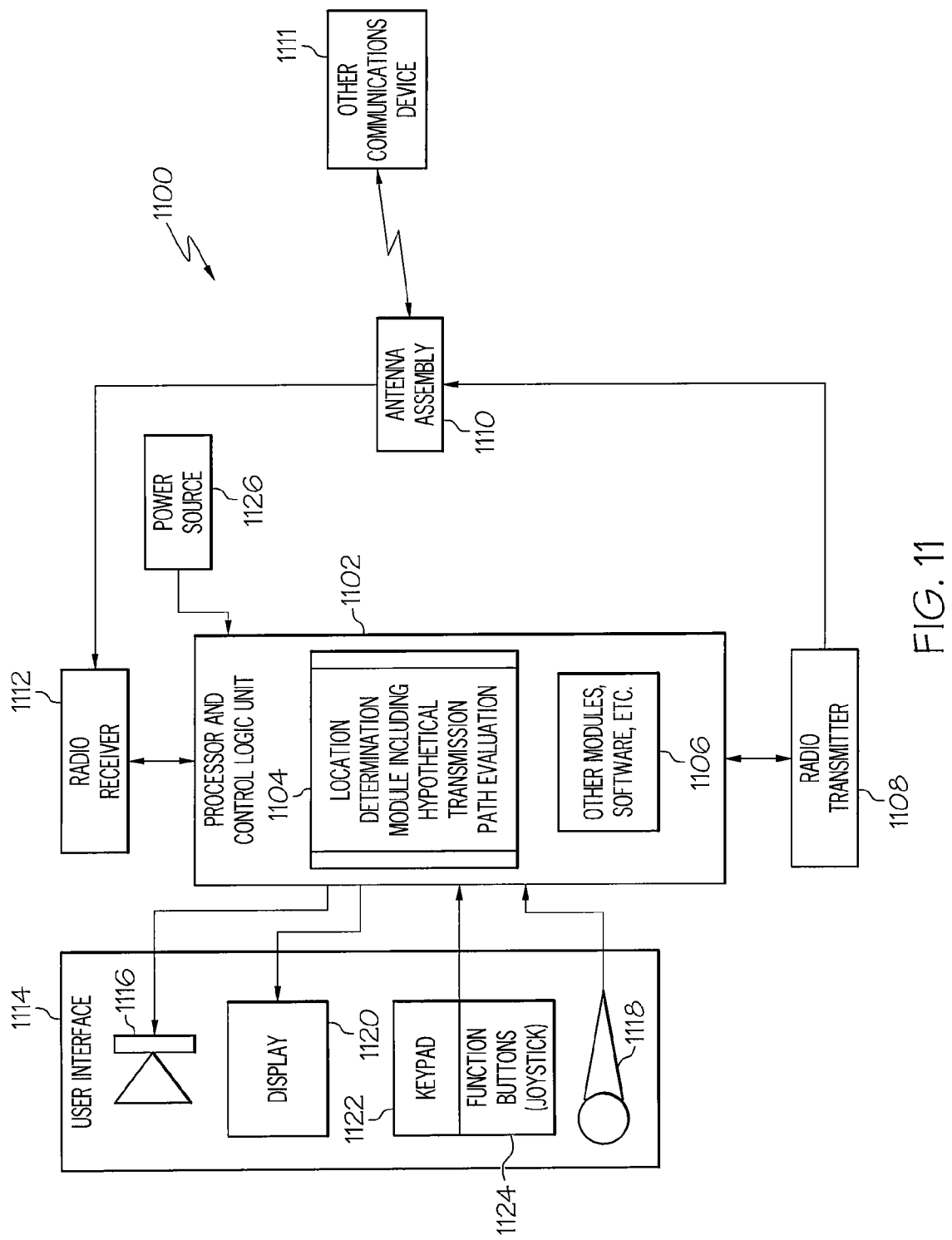
FIG. 11 is a block diagram of an example of a device to determine a location of a communications device in accordance with an embodiment of the present invention.

FIG. 11 is a block diagram of an example of a device 1100 to determine a location of a communications device in accordance with an embodiment of the present invention. The device 1100 may be the communications device itself for which the location is desired or the device 1100 may be associated with another device for which the location is desired. The device 1100 may be part of a vehicle or the other device may be a vehicle, such as an aerospace vehicle, terrestrial vehicle, watercraft or other type of vehicle.

The device 1100 may include a processor and control logic unit 1102 to control operation of the other components of the device 1100. A location determination module 1104 may be operable on the processor and control logic unit 1102. The location determination module 1104 may include a hypothetical transmission path evaluation or testing element. The method 100 may be embodied in the location determination module 1104 including the hypothetical transmission path evaluation or test element. Other modules, software or the like 1106 may be operable on the processor and control logic unit 1102 to perform other functions or operations associated with the device 1100.

The device 1100 may also include a radio transmitter 1108 to transmit signals via an antenna assembly 1110 to another communications device (transmitter or receiver) 1111. The transmitted signals may be bounced or scattered by scattering centers similar to that previously described.

The device 1100 may also include a radio receiver 112 to receive signals via the antenna assembly 1110 from other communications devices 1111.

The device 1100 may also include a user interface 1114 to permit an operator to use and control operation of the device 1100. The user interface may include a speaker 1116 to transmit audible signals to the user and a microphone 1118 to receive voice communications from the user for conversion to radio frequency signals for transmission by the radio transmitter 1108. The user interface 1114 may also include a display 1120, a keypad 1122 or the like and function buttons, joystick or similar control apparatus 1124 for the user to input commands for operation by the device 1100.

The device 1100 may also include a power source 1126. The power source 1126 may be a battery or other energy storage device to permit mobile operation of the device 1100.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to determine a location of a communications device, comprising:
   measuring a time of arrival for each pulse received at a receiver;
   generating a plurality of transmission path-time matching hypotheses, each transmission path-time matching hypothesis including a set of hypothetical matches between each received pulse and a possible transmission path between a transmitter and the receiver, wherein each hypothetical match corresponds to the received pulse being able to have traveled over the possible transmission path between the transmitter and the receiver based on a transmit time of the received pulse, wherein generating the plurality of transmission path-time matching hypotheses comprises:
      determining possible transmission paths from the transmitter to the receiver including all combinations for any bounces or scattering from any scattering centers;
      determining substantially all permutations of transmission paths grouped into sets of different transmission paths based on a number of pulses received by the receiver;
      associating each transmission path in each set of different transmission paths with a unique pulse of the pulses received for each permutation; and
      creating a hypothetical match between the unique pulse and the associated transmission path for each permutation, the unique pulse being able to have traveled over the associated transmission path, wherein each of the plurality of transmission path-time matching hypotheses includes a set of different hypothetical matches corresponding to each set of different transmission paths;
   determining an intersection error for each transmission path-time matching hypothesis, wherein each hypothetical match defines a locus of possible communications device locations and an intersection of loci of the set of different hypothetical matches for each transmission path-time matching hypothesis provides an estimate of the location of the communications device for that transmission path-time matching hypothesis, the intersection error for each transmission path-time matching hypothesis providing an indication that the intersection of loci for each transmission path-time matching hypothesis being substantially at a single point to estimate the location of the communications device; and
   estimating the location of the communications device as the intersection of loci for the transmission path-time matching hypothesis with a lowest intersection error.

2. The method of claim 1, wherein estimating the location of the communications device comprises determining the locus of possible communications device locations for each pulse using the hypothetical matches.

3. The method of claim 2, further comprising determining the estimated location of the communications device as the intersection of possible communications device location loci for each set of hypothetical matches for each pulse.

4. The method of claim 2, further comprising:
   defining a hypothetical transmit time for each pulse in response to the transmit time for each pulse being unknown;
   generating an additional set of hypothetical matches for each hypothetical transmit time and transmission path;
   determining a locus of possible communications device locations using each set of hypothetical matches for each pulse and each hypothetical transmit time; and
   determining an estimated location of the communications device as an intersection of possible communications device location loci for each set of hypothetical matches for each pulse and for each hypothetical transmit time.

5. The method of claim 2, wherein determining the locus of possible communications device locations comprises defining a circle centered at a first scattering center from the communications device in each hypothetical match including a NLOS transmission path, if the communications device to be located is the transmitter.

6. The method of claim 2, wherein determining the locus of possible communications device locations comprises defining a circle centered at a last scattering center before the communications device in each hypothetical match including a NLOS transmission path, if the communications device to be located is the receiver.

7. The method of claim 1, wherein determining the intersection error, comprises:
   approximating each locus of possible communications device locations as a set of discrete points;
   looping each discrete point over other loci for each possible communications device location;

determining a residual error for each discrete point in loci for each possible communications device location;
determining a sum of squares of residual error for each discrete point; and
selecting the estimated communications device location as a discrete point with a minimum sum of residual errors.

8. The method of claim 1, further comprising forming a set of possible transmission paths from the transmitter to the receiver.

9. The method of claim 8, wherein forming the set of possible transmission paths comprises:
forming a direct transmission path from the transmitter to the receiver;
forming all combinations for bounces from any scattering centers; and
determining all permutations of possible transmission paths grouped into sets of elements based on a number of pulses received by the receiver.

10. The method of claim 9, further comprising associating each set of elements with a unique received pulse for each permutation.

11. The method of claim 10, further comprising creating each hypothetical match associated with a unique pulse for each transmit time or hypothetical transmit time.

12. The method of claim 1, further comprising determining a location of any scattering centers.

13. The method of claim 12, further comprising:
estimating a location of the receiver if the communications device to be located is the transmitter; and
estimating a location of the transmitter if the communications device to be located is the receiver.

14. A method to determine a location of a communications device, comprising:
measuring a time of arrival for each pulse received at a receiver;
generating a plurality of transmission path-time matching hypotheses, wherein generating the plurality of transmission path-time matching hypotheses comprises:
determining possible transmission paths from the transmitter to the receiver including all combinations for any bounces or scattering from any scattering centers;
determining substantially all permutations of transmission paths grouped into sets of different transmission paths based on a number of pulses received by the receiver;
associating each transmission path in each set of different transmission paths with a unique of the pulses received for each permutation; and
creating a hypothetical match between the unique pulse and the associated transmission path for each permutation, the unique pulse being able to have traveled over the associated transmission path, wherein each of the plurality of transmission path-time matching hypotheses includes a set of different hypothetical matches corresponding to each set of different transmission paths;
determining an intersection error for each transmission path-time matching hypotheses, wherein each hypothetical match defines a locus of possible communications device locations and an intersection of loci of the set of different hypothetical matches for each transmission path-time matching hypothesis provides an estimate of the location of the communications device for that transmission path-time matching hypothesis, the intersection error for each transmission path-time matching hypothesis providing an indication that the intersection of loci for each transmission path-time matching hypothesis being substantially at a single point to estimate the location of the communications device; and
determining the estimated location of the communications device as an intersection of loci for the transmission path-time matching hypothesis with a lowest intersection error.

15. The method of claim 14, further comprising:
defining a hypothetical transmit time for each pulse in response to a transmit time for each pulse being unknown;
generating an additional set of hypothetical matches for each hypothetical transmit time, pulse and transmission path;
determining a locus of possible communications device locations using each set of hypothetical matches for each pulse and each hypothetical transmit time; and
determining an estimated location of the communications device as an intersection of possible communications device location loci for each set of hypothetical matches for each pulse and for each hypothetical transmit time.

16. The method of claim 15, wherein determining the locus of possible communications device locations comprises defining a circle centered at a first scattering center from the communications device in each hypothetical match including a NLOS transmission path if the communications device to be located is the transmitter.

17. The method of claim 15, wherein determining the locus of possible communications device locations comprises defining a circle centered around a last scattering center before the communications device in each hypothetical match including a NLOS transmission path if the communications device to be located is the receiver.

18. A device to determine a location of a communications device, comprising:
a processor;
a location determination module including a hypothetical match evaluation element operable on the processor to evaluate a match between each received pulse and a possible transmission path of the pulse to determine a location of the communications device, wherein the location determination module comprises:
means for measuring a time of arrival for each pulse received at a receiver;
means for generating a plurality of transmission path-time matching hypotheses, wherein the means for generating the plurality of transmission path-time matching hypotheses comprises:
means for determining possible transmission paths from the transmitter to the receiver including all combinations for any bounces or scattering from any scattering centers;
means for determining substantially all permutations of transmission paths grouped into sets of different transmission paths based on a number of pulses received by the receiver;
means for associating each transmission path in each set of different transmission paths with a unique pulse of the pulses received for each permutation; and
means for creating a hypothetical match between the unique pulse and the associated transmission path for each permutation, the unique pulse being able to have traveled over the associated transmission path, wherein each of the plurality of transmission path-time matching hypotheses includes a set of different hypothetical matches corresponding to each set of different transmission paths;

a module for determining an intersection error for each transmission path-time matching hypotheses, wherein each hypothetical match defines a locus of possible communications device locations and an intersection of loci of the set of different hypothetical matches for each transmission path-time matching hypothesis provides an estimate of the location of the communications device for that transmission path-time matching hypothesis, the intersection error for each transmission path-time matching hypothesis providing an indication that the intersection of loci for each transmission path-time matching hypothesis being substantially at a single point to estimate the location of the communications device; and means for estimating the location of the communications device as the intersection of loci for the transmission path-time matching hypothesis with a lowest intersection error.

19. The device of claim 18, wherein the means for estimating the location of the communications device comprises means for determining the locus of possible communications device locations using the hypothetical matches for each pulse.

20. The device of claim 19, further comprising means for determining the estimated location of the communications device as the intersection of possible communications device location loci for each set of hypothetical transmission paths for each pulse.

21. The device of claim 19, further comprising:
means for defining a hypothetical transmit time for each pulse in response to a transmit time for each pulse being unknown;
means for generating an additional set of hypothetical matches for each hypothetical transmit time, pulse and transmission path;
means for determining a locus of possible communications device locations using the hypothetical matches for each pulse and each hypothetical transmit time; and
means for determining an estimated location of the communications device as an intersection of possible communications device location loci for the set of hypothetical matches for each pulse and for each hypothetical transmit time.

22. The device of claim 18, wherein the communications device comprises the device to determine the location of the communications device.

23. A computer program product to determine a location of a communications device, the computer program product comprising:
a computer usable storage medium having computer usable program code embodied therein, the computer usable program code comprising:
computer usable program code configured to measure a time of arrival for each pulse received at a receiver;
computer usable program code configured to generate a plurality of transmission path-time matching hypotheses wherein the computer usable program code configured to generate the plurality of transmission path-time matching hypotheses comprises:
computer usable program code configured to determine possible transmission paths from the transmitter to the receiver including all combinations for any bounces or scattering from any scattering centers;
computer usable program code configured to determine substantially all permutations of transmission paths grouped into sets of different transmission paths based on a number of pulses received by the receiver;
computer usable program code configured to associate each transmission path in each set of different transmission paths with a unique pulse of the pulses received for each permutation; and
computer usable program code configured to create a hypothetical match between the unique pulse and the associated transmission path for each permutation, the unique pulse being able to have traveled over the associated transmission path, wherein each of the plurality of transmission path-time matching hypotheses includes a set of different hypothetical matches corresponding to each set of different transmission paths;
computer useable program code configured to determine an intersection error for each transmission path-time matching hypothesis, wherein each hypothetical match defines a locus of possible communications device locations and an intersection of loci of the set of hypothetical matches for each transmission path-time matching hypothesis provides an estimate of the location of the communications device for that transmission path-time matching hypothesis, the intersection error for each transmission path-time matching hypothesis providing an indication of the intersection of loci for each transmission path-time matching hypothesis being substantially at a single point to estimate the location of the communications device; and
computer usable program code configured to estimate the location of the communications device as the intersection of loci for the transmission path-time matching hypothesis with a lowest intersection error.

24. The computer program product of claim 23, further comprising computer usable program code configured to determine the locus of possible communications device locations for each pulse using the hypothetical matches.

25. The computer program product of claim 24, further comprising computer usable program code configured to determining the estimated location of the communications device as the intersection of possible communications device location loci for each set of hypothetical matches for each pulse.

26. The computer program product of claim 25, further comprising:
computer usable program code configured to define a hypothetical transmit time for each pulse in response to the transmit time for each pulse being unknown;
computer usable program code configured to generate an additional set of hypothetical matches for each hypothetical transmit time and path;
computer usable program code configured to determine a locus of possible communications device locations using each set of hypothetical matches for each pulse and each hypothetical transmit time; and
computer usable program code configured to determine an estimated location of the communications device as an intersection of possible communications device location loci for each set of hypothetical matches for each pulse and for each hypothetical transmit time.

27. A vehicle, comprising:
a device to determine a location of the vehicle, wherein the device includes:
a processor;
a location determination module including a hypothetical match evaluation element operable on the processor to evaluate a match between each received pulse and a possible transmission path of the pulse to determine a location of the vehicle, wherein the location determination module comprises:

means for measuring a time of arrival for each pulse received at a receiver;

means for generating a plurality of transmission path-time matching hypotheses, wherein the means for generating the plurality of transmission path-time matching hypotheses comprises:

means for determining possible transmission paths from the transmitter to the receiver including all combinations for any bounces or scattering from any scattering centers;

means for determining substantially all permutations of transmission paths grouped into sets of different transmission paths based on a number of pulses received by the receiver;

means for associating each transmission path in each set of different transmission paths with a unique pulse of the pulses received for each permutation; and means for creating a hypothetical match between the unique pulse and the associated transmission path for each permutation the unique pulse being able to have traveled over the associated transmission path, wherein each of the plurality of transmission path-time matching hypotheses includes a set of different hypothetical matches corresponding to each set of different transmission paths;

a module for determining an intersection error for each transmission path-time matching hypotheses, wherein each hypothetical match defines a locus of possible communications device locations and an intersection of loci of the set of hypothetical matches for each transmission path-time matching hypothesis provides an estimate of the location of the communications device for that transmission path-time matching hypothesis, the intersection error for each transmission path-time matching hypothesis providing an indication that the intersection of loci for each transmission path-time matching hypothesis being substantially at a single point to estimate the location of the communications device; and means for estimating the location of the communications device as the intersection of loci for the transmission path-time matching hypothesis with a lowest intersection error.

28. The vehicle of claim 27, wherein the means for estimating the location of the communications device comprises means for determining a locus of possible communications device locations using the hypothetical matches for each pulse.

\* \* \* \* \*